(12) United States Patent
Mercier et al.

(10) Patent No.: US 8,605,272 B2
(45) Date of Patent: Dec. 10, 2013

(54) TOOL, TOOL SET AND METHOD OF SETTING THE PITCH OF THE BLADES OF A MODEL PROPELLER

(75) Inventors: Jean-Marc Mercier, Tournefeuille (FR); Philippe De Laroque, Saint Orens de Gameville (FR); Thierry Bergeaud, Castanet Tolosan (FR); Jean-Luc Larcher, Colomiers (FR); Jean-Marc Prosper, Cugnaux (FR); Viken Mekhsian, Toulouse (FR); Maurice Dufour, Muret (FR)

(73) Assignee: Airbus Operations S.A.S., Toulouse (FR)

( * ) Notice: Subject to any disclaimer, the term of this patent is extended or adjusted under 35 U.S.C. 154(b) by 1022 days.

(21) Appl. No.: 12/644,680

(22) Filed: Dec. 22, 2009

(65) Prior Publication Data
US 2010/0162566 A1 Jul. 1, 2010

(30) Foreign Application Priority Data
Dec. 22, 2008 (FR) ...................................... 08 07340

(51) Int. Cl.
*G01B 11/26* (2006.01)
(52) U.S. Cl.
USPC ..... 356/138; 356/244; 356/237.2; 250/214 A; 250/214 G; 250/231.13
(58) Field of Classification Search
USPC .................. 356/138, 244, 152.1; 250/231.13
See application file for complete search history.

(56) References Cited

U.S. PATENT DOCUMENTS

| 2,000,926 | A | | 5/1935 | Cox |
| 3,996,670 | A | | 12/1976 | Joyal et al. |
| 4,067,116 | A | * | 1/1978 | Bryner et al. ................... 33/343 |
| 4,227,807 | A | | 10/1980 | Pond et al. |
| 4,895,448 | A | | 1/1990 | Laird |
| 5,511,426 | A | * | 4/1996 | Clement et al. ................. 73/655 |
| 7,341,428 | B2 | * | 3/2008 | Twerdochlib ..................... 416/1 |
| 8,126,662 | B2 | * | 2/2012 | Twerdochlib ................... 702/56 |
| 8,499,626 | B2 | * | 8/2013 | Greciet et al. .................. 73/147 |
| 2005/0188759 | A1 | | 9/2005 | Omotani |
| 2007/0035135 | A1 | * | 2/2007 | Yoshida .......................... 290/44 |
| 2010/0052320 | A1 | * | 3/2010 | Hoffmann ....................... 290/44 |

FOREIGN PATENT DOCUMENTS

GB 2 211 603 A 7/1989

* cited by examiner

*Primary Examiner* — Tarifur Chowdhury
*Assistant Examiner* — Isiaka Akanbi
(74) *Attorney, Agent, or Firm* — Oblon, Spivak, McClelland, Maier & Neustadt, L.L.P.

(57) ABSTRACT

A tool for tuning the pitch of blades on a model propeller with pivoting blades, the tool comprising a mount for the model propeller and a calculation module. The mount allows the propeller to be positioned such that the axis of the propeller coincides with a fixed reference axis of the mount and to place each blade of the propeller, successively, in a measurement position. The calculation module determines the angle between a chord of a blade in the measurement position and a fixed reference plane of the tool, the fixed reference plane being orthogonal to the fixed reference axis, based on optical sightings by the calculation model on a suction face of the blade in the measurement position.

17 Claims, 4 Drawing Sheets

Figure 1:
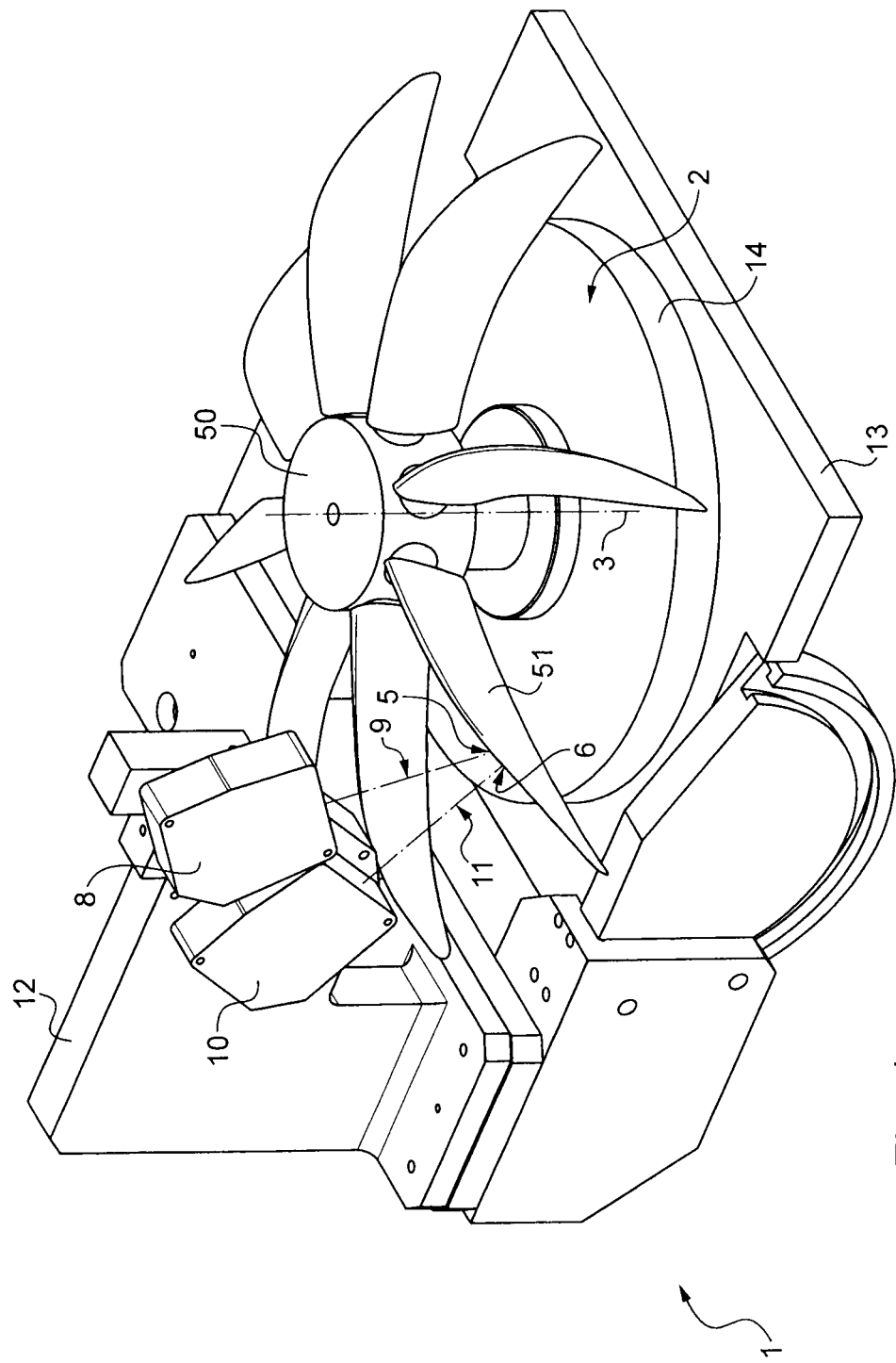

TOOL, TOOL SET AND METHOD OF SETTING THE PITCH OF THE BLADES OF A MODEL PROPELLER

The present invention relates to a tool for tuning the pitch of the blades of a model propeller. The invention relates in particular to the technical field of aircraft models constructed to perform wind-tunnel tests.

As a foreword, it is recalled that the terms "blade axis" of a propeller blade commonly denote the axis that orthogonally intersects the axis of rotation of the propeller and passes through the root of the said blade, the root of a blade being the point at which it is anchored to the propeller hub. The chord of a blade in a given section (in a plane orthogonal to the blade axis) of the said blade is the line joining the leading edge and the trailing edge of the blade. Furthermore, the pitch or setting angle of a propeller blade denotes the angle between the plane of rotation of the propeller and the chord of the said blade in a given section of the blade. The blade section considered in defining the blade pitch is usually determined by the propeller manufacturer. Considering that the blades of a propeller are normally all set in such a way as to have identical pitches, the terms "blade pitch" denote the pitch of one or of each of the propeller blades. Finally, the suction face of a propeller blade is the front face—oriented in the thrust direction—of the said blade.

The propeller engines or the turbojet engines known in aircraft generally have propellers (referred to as fans in the case of turbojet engines) with tunable pitch. The pitch of each of the propellers of the aircraft can be increased or decreased automatically or by decision of the pilot, depending on the airspeed, for example to deliver more force at low speed (while climbing) or less force at high speed (while cruising). In this way the pitch of a propeller can be modified, for example, within a range extending from 20° to 60°-65°.

A propeller develops a blast that depends on its pitch and that has an influence on the aerodynamic characteristics of the aircraft. For testing this influence, it is known to construct an aircraft model equipped with propellers whose blades can be oriented manually, and to conduct wind-tunnel tests on this model for a certain number of given propeller pitches. A first type of tuning tool has been developed by the Applicant for tuning the pitch of the blades of each model propeller with a specified precision of ±0.1 degree. This tool comprises: a sleeve for mounting the tool on a hub of the propeller; a graduated scale along a circular arc and an associated vernier; two shoes supported by the said scale and designed to be placed flush against the suction face of the blade to be set, the scale and the vernier indicating the angle formed by the line passing through the two shoes and a fixed reference plane of the tool; a knurled knob making it possible to adjust this angle.

In order that the wind-tunnel tests can be fully processed, the pitch of each blade of a model propeller should be tuned as precisely as possible. In the case of a symmetric aircraft model, whose port propeller turns in the direction opposite to that of the corresponding starboard propeller and has inverted blades, this precision is crucial.

Following tests conducted in wind tunnels with model propellers tuned by means of the first type of tool described hereinabove, it became apparent that the specified precision of ±0.1 degree was insufficient relative to the test objectives. In addition, the tuning of a propeller with this tool is particularly time-consuming.

The objective of the invention is to alleviate these disadvantages by proposing a tool for tuning the pitch of the blades of a model propeller making it possible to set each propeller blade with increased precision, and this with certainty.

Another objective of the invention is to propose a tuning tool capable of setting all of the blades of a propeller in a shorter time.

In a preferred version, an objective of the invention is to provide a tool set for tuning the pitch of the blades of a model propeller and a tuning method using this tool set, which offer a precision on the order of ±0.05 degree or better.

To accomplish this, the invention proposes a tool for tuning the pitch of the blades of a model propeller with pivoting blades, characterized in that it comprises:
  means for mounting the model propeller in the tool, able to make it possible on the one hand to position the propeller in such a way that its axis of rotation coincides with a fixed axis of the tool, referred to as reference axis, and on the other hand to place each blade of the propeller successively in a position referred to as measurement position,
  optical means for determining the angle between a chord of a blade in measurement position and a fixed reference plane of the tool orthogonal to the reference axis on the basis of two points, referred to as measurement points, sighted by the said optical means on the suction face of the said blade in measurement position.

The angle determined in this way by the optical means according to the invention yields a value of the pitch of the blade that is in measurement position, with a precision much better than the precisions achieved by the known prior art tools. Considering the current manufacturing tolerances of mechanical parts (which make it possible to disregard any possible alignment error between the axis of rotation of the propeller and the reference axis of the tool, as well as any possible angular error in the plane of rotation of the propeller between the real position of the blade and the measurement position) and performances of the optical means used in metrology, the precision achieved with the tool according to the invention is better than ±0.1 degree and may even be on the order of ±0.05 degree.

The inventors have actually determined that the lack of precision of the known prior art tool described by way of introduction resulted mainly from the following factors:
  reading the vernier, which makes it possible to calibrate the tool over a desired angle, introduces a first error, since by its nature such reading is approximate and subjective;
  the notion of contact between each shoe and the blade to be set is subjective (since contact can be verified only with the naked eye); this subjectivity induces a large error;
  bringing the blade into contact with the shoes may cause slight bending of the blade, which induces an additional error;
  the mechanism connecting the shoes to the vernier is susceptible to wear, which falsifies the measurement.

The use of optical and thus contactless optical means according to the invention makes it possible to suppress the aforesaid errors and to increase the setting precision considerably.

The invention extends to a method for tuning the pitch of the blades of a model propeller with pivoting blades, characterized in that:
  the model propeller is mounted in a tool according to the invention,
  each blade of the model propeller is placed successively in measurement position, and the said blade in measurement position is set by making it pivot until the angle determined by the optical means corresponds as well as possible and is preferably equal to a predetermined specified angle.

The specified angle can be chosen to be equal to the pitch desired for the model propeller. However, this is not the only possible embodiment, as will be explained hereinafter.

As a general rule, the pivoting axis of a propeller blade (of an aircraft or aircraft model) corresponds to the blade axis of the said blade. Preferably the two measurement points sighted by the optical means according to the invention are situated in a plane of the tool, referred to as measurement plane, substantially orthogonal to an axis (referred to as measurement-position axis) that orthogonally intersects the reference axis of the tool and passes through the root of a blade in measurement position. In other words, the measurement plane is substantially orthogonal to the blade axis of the blade in measurement position.

Preferably the tool comprises means for adjusting the distance separating the reference axis and the measurement plane. In the method according to the invention, the optical means are advantageously disposed with the aid of the said adjusting means in such a way that the distance separating the reference axis and the measurement plane is between 65% and 80%, preferably on the order of 70% or 75%, of a maximum radius of the model propeller to be tuned.

Advantageously the optical means of the tool are adapted to make it possible to sight a measurement point close to the leading edge of a blade in measurement position and a measurement point close to the trailing edge of the said blade.

Advantageously the optical means of the tool comprise two laser transducers, one—the first—of the said laser transducers being capable of measuring the distance d1 separating it from one—the first—of the measurement points, the second laser transducer being capable of measuring the distance d2 separating it from the second measurement point.

As explained above, the first—respectively second—laser transducer is preferably mounted in the tool in such a way that it has a fixed sighting direction, so that it can sight a measurement point close to the leading edge—respectively the trailing edge—of the blade in measurement position, regardless of the pitch of the said blade. The sighting direction of each transducer is therefore determined beforehand as a function of the profile of the propeller blades to be tuned. If necessary, the tool can comprise means for adjusting the orientation of the sighting direction of each laser transducer, so that this orientation can be adapted to the blade profile in question. For a given blade profile, the sighting directions of the laser transducers furthermore being known, there exists a unique relationship between each pair of distances (d1, d2) and the angle between the chord of the blade in measurement position and the reference plane. This angle can therefore clearly be determined by measuring the distances d1 and d2.

Advantageously the means for mounting a tool according to the invention comprise:
  a turntable for receiving a propeller, mounted to rotate around the reference axis and equipped with polarization means capable of imposing a relative angular position, in a plane orthogonal to the reference axis, between the propeller and the turntable,
  means for locking the turntable in a plurality of predetermined positions, in each of which one blade of the propeller is in measurement position. For example, the locking means comprise, on the one hand, conical holes machined in the thickness of the turntable and spaced regularly around it, and, on the other hand, a conical locator mounted to slide along its axis between a retracted position, in which it does not interfere with the rotary turntable, and a locking position, in which it is wedged into a conical hole of the turntable. In one possible embodiment, the axis of each hole coincides with the blade axis of a blade of a propeller mounted in the tool (alternatively, the axis of each hole is offset by a given angle (identical for all holes) relative to the blade axis of the closest blade). In this way, the sequential placement of the blades of the model propeller in measurement position is achieved precisely and objectively,
  alternatively, the means for mounting the tool comprise motorized means for driving the turntable in rotation and means for monitoring the angle of rotation of the said turntable; for example, these mounting means comprise a stepping motor and an incremental coder. The tool is then advantageously adapted to control these driving means in such a way that the turntable can be displaced in rotation by an angle (or by a multiple of the said angle) corresponding exactly to the angular sector between two consecutive blades of the model propeller. In this case, the sequential placement of the blades of the model propeller in measurement position is not only precise and objective but also automated.

Advantageously the angle determined by the optical means for each blade of the model propeller at the end of the setting operation is recorded in memory means of the tool. In this way the tool offers traceability with respect to the pitches of the blades of the tuned propeller, which can be useful for processing the results of tests subsequently performed on the aircraft model Advantageously the tool according to the invention can also be used after a wind-tunnel test conducted on an aircraft model, in order to check the pitch—considered to be the angle determined by the optical means of the tool—of each of the blades of the propellers of the said model. These measurements can be used to analyze and interpret the test results.

In addition, the tool offers the possibility of recording the pitch—considered to be the angle determined by the optical means of the tool—of each of the blades of a model propeller, both at the end of the setting operation (before the test) and after the test, and of comparing the measurements obtained.

The invention extends to a tool set comprising, on the one hand, the tool defined above and, on the other hand, at least one propeller, referred to as standard propeller, adapted so that it can be mounted in the tool and comprising a plurality of blades, referred to as standard blades, fixed and having different pitches.

Preferably the tool set according to the invention comprises at least two standard propellers, including a standard propeller whose blades all have left-hand pitches and a standard propeller whose blades all have right-hand pitches.

The tuning method according to the invention advantageously uses such a tool set as follows:
  a standard blade theoretically having a pitch equal (both in terms of degrees and of left-hand or right-hand orientation) to the pitch desired for the model propeller is selected,
  the corresponding standard propeller is mounted in the tool in such a way that the selected standard blade is placed in measurement position,
  the angle determined by the optical means for this standard blade in measurement position is recorded in memory means of the tool as a specified angle,
  the standard propeller is removed from the tool and the model propeller is mounted in the tool,
  as explained above, each blade of the model propeller is set by making the blade in measurement position pivot until the angle determined by the optical means is equal to or at least substantially equal to the previously recorded specified angle.

In this way the distances measured by the laser transducers—or other optical measurement devices—are used not as absolute values but as relative values with regard to standard measurements, which makes it possible to cancel out the possible intrinsic measurement errors (due to manufacturing tolerances and to the sensitivity of the transducers) of the optical measuring devices used and to improve the precision considerably. In this way there is achieved precision much better than 0.1 degree and even better than 0.05 degree, and good symmetry in the case of a model comprising corresponding port and starboard propellers turning in opposite directions.

Preferably each of the two standard propellers (with left-hand pitch and right-hand pitch respectively) has as many blades as propeller pitches intended to be tested during the aircraft test campaign. If it is nevertheless desired to perform a test with a propeller pitch for which a standard blade is not available, it is advantageous to proceed as follows:

at least one standard blade having a pitch as close as possible to the pitch desired for the model propeller is selected; preferably at most two standard blades are selected in this way, for each standard blade selected in this way, the corresponding standard propeller is mounted in the tool in such a way that the said standard blade is placed in measurement position, and the angle determined by the optical means for this standard blade in measurement position is recorded in the memory means of the tool, an angle corresponding to the desired pitch such as it should be determined by the optical means is calculated by comparison and interpolation on the basis of each previously recorded angle and of the pitch of the corresponding standard blade; the angle calculated in this way is recorded as the specified angle, the standard propeller is removed from the tool and the model propeller is mounted in the tool (this step can be carried out before, during or after the preceding step), as explained in the foregoing, each blade of the model propeller is set by making the blade in measurement position pivot until the angle determined by the optical means is equal or at least substantially equal to the previously recorded specified angle.

Advantageously each blade of a standard propeller is obtained on the suction-face side by machining with a machining allowance of 0.05 mm before being fixed in the standard propeller, then by finish-polishing after fixation of the blade in the standard propeller until the pitch desired for this standard blade has been obtained, this polishing operation being performed under the control of a 3D measuring machine.

Figure 2:
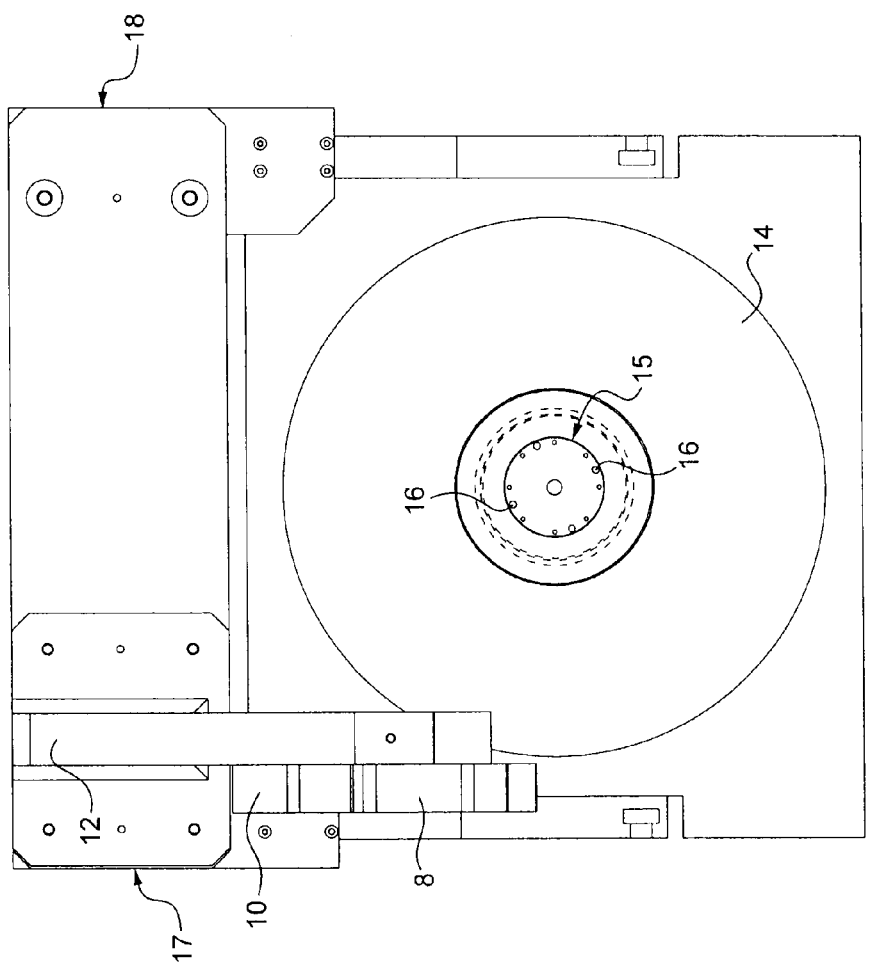
Figure 3:
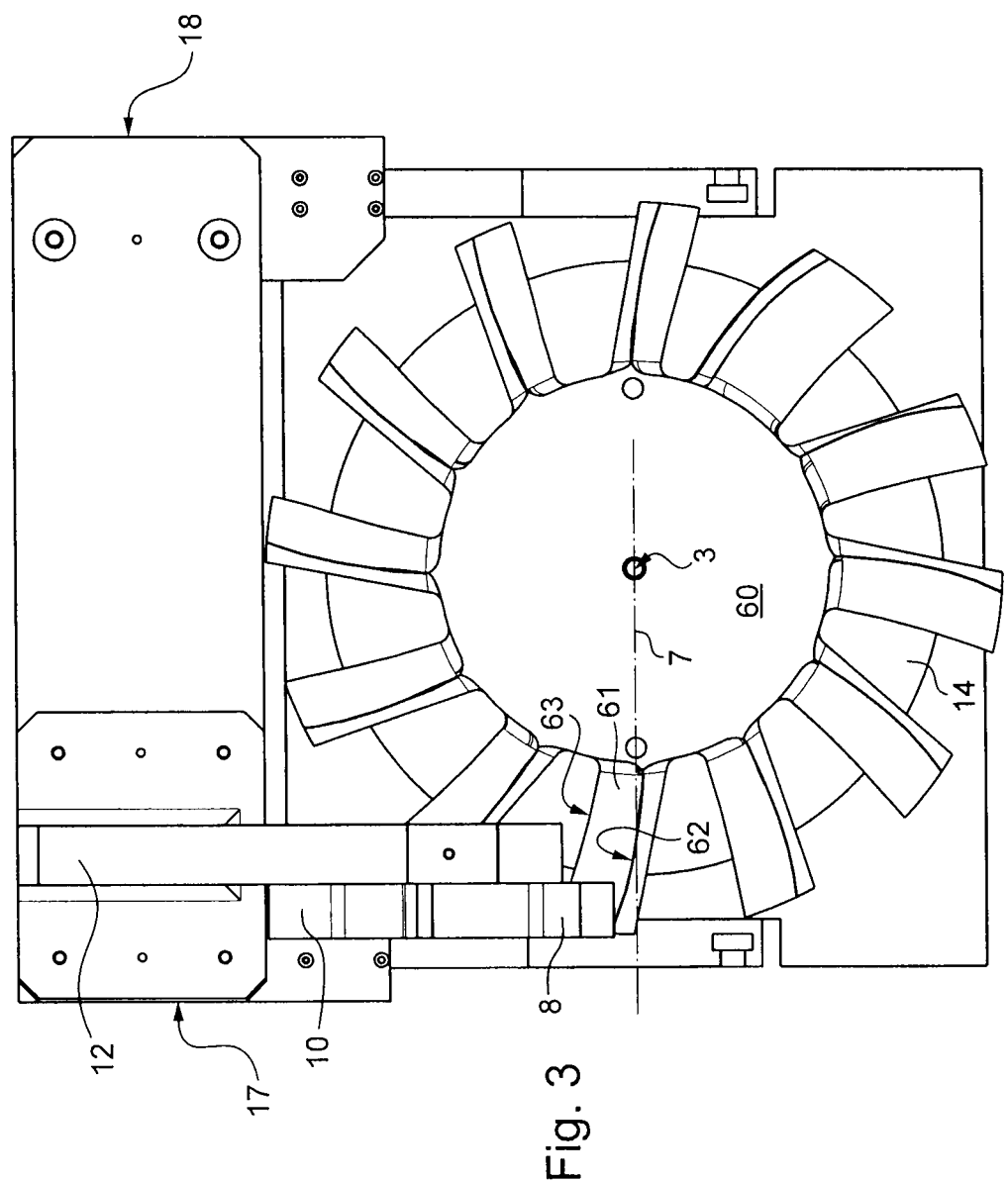
Figure 4:
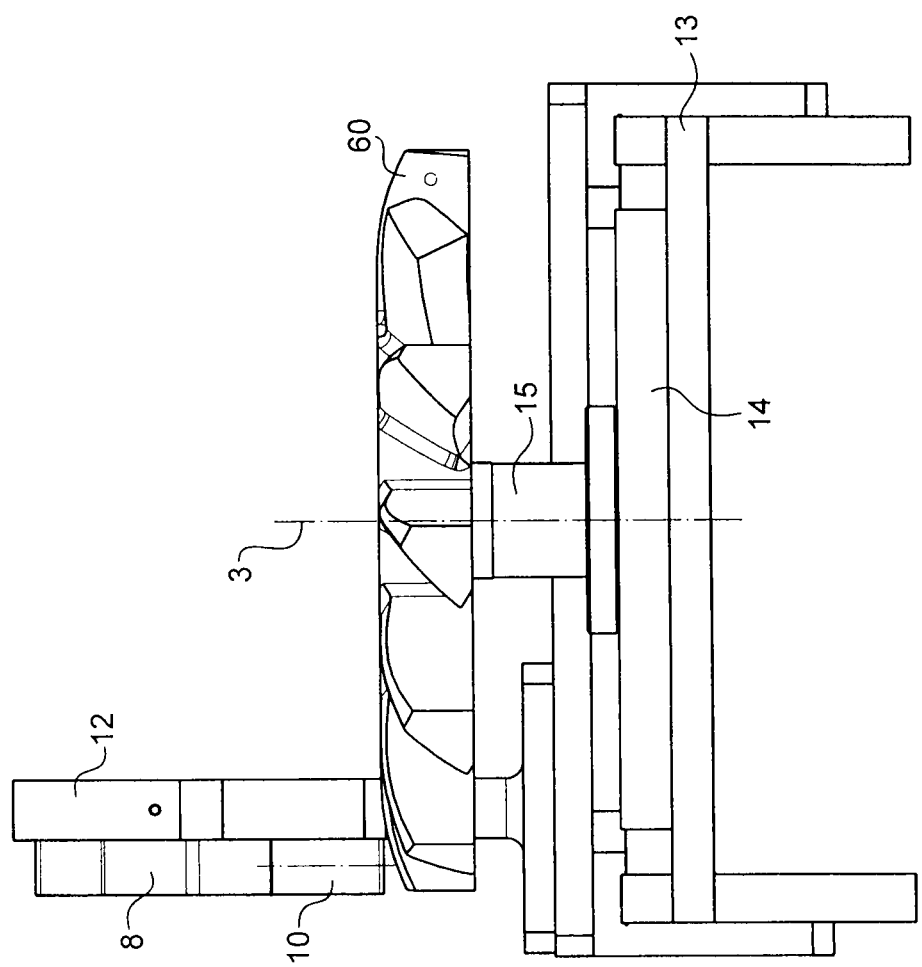

Other details and advantages of the present invention will become apparent on reading following the description, which refers to the attached schematic drawings and relates to preferred embodiments, provided by way of non-limitative examples. In these drawings:

FIG. 1 is a perspective schematic view of a tool according to the invention, in which there is mounted a model propeller, FIG. 2 is an overhead view of the tool of FIG. 1, FIG. 3 is an overhead view of a tool set according to the invention, comprising the tool of FIGS. 1 and 2 and a standard propeller mounted in the tool, FIG. 4 is a front view of the tool set of FIG. 3.

Tool 1 according to the invention illustrated in FIGS. 1 to 4 makes it possible to tune a model propeller such as propeller 50 illustrated in FIG. 1. Such a propeller comprises:

a two-part hub, wherein the junction plane is orthogonal to the axis of rotation of the propeller, eight pivoting blades, each blade having a root countersunk between the two parts of the propeller hub in such a way that it can pivot round the blade axis (the terms "blade axis" of a propeller blade denoting the radius of the propeller passing through the root of the said blade), means (threaded) for clamping the two parts of the hub against one another, making it possible to wedge the roots of the blades and in this way to block their ability to pivot.

The tool according to the invention comprises means 2 for mounting a propeller in the tool and optical means 4, described hereinafter.

Mounting means 2 make it possible to mount, in the tool, a model propeller such as propeller 50 described above or a standard propeller such as propeller 60 illustrated in FIGS. 3 and 4. These mounting means advantageously comprise a fixed bedplate 13 and a turntable 14 supported by the said bedplate and mounted to rotate around a reference axis 3 of the tool. Turntable 14 comprises a disk-shaped base and, topping the latter, a support column 15 integral with the said base and centered on reference axis 3. Support column 15 has an upper end for receiving a propeller, capable of being nested in a conjugate central seat machined in the hub of the propeller (whether a model propeller 50 or a standard propeller 60). The central seat of the propeller hub is centered on the axis of rotation of the propeller, in such a way that the axis of rotation of the propeller—when it is mounted in the tool—coincides with reference axis 3 of the tool. The upper end of support column 15 is additionally equipped with positioning locators 16, capable of cooperating with conjugate positioning holes machined in the central seat of the propeller hub. In this way these positioning locators 16 form, together with the positioning holes of the propeller, polarization means capable of imposing a relative angular position between the propeller and turntable 14 in a plane orthogonal to reference axis 3. In the illustrated example, four bores for receiving positioning locators are made in support column 15, but only two positioning locators 16 are used; the two corresponding bores are selected for the precision of their diameter and of their position on support column 15. When a propeller (model or standard) is mounted in the tool, it rotates integrally with turntable 14.

Mounting means 2 also comprise means (not illustrated) for locking turntable 14 in rotation, which make it possible to lock the turntable in as many positions as the model propeller has blades, and in this way to place the different blades of a model propeller mounted in the tool successively in a position referred to as measurement position, defined more precisely hereinafter. These locking means may be of the type of an indexing system having conical locator(s).

Optical means 4 of tool 1 comprise a first laser transducer 8 emitting an incident light beam 9 and a second laser transducer 10 emitting an incident light beam 11. Emitted beams 9 and 11 are situated in the same plane, referred to as measurement plane, which is parallel to reference axis 3. This measurement plane is substantially orthogonal to an axis 7 referred to as measurement-position axis, which orthogonally intersects reference axis 3. A blade in measurement position, such as blade 51 of model propeller 50 visible in FIG. 1 or blade 61 of the standard propeller visible in FIG. 3, has a blade axis substantially aligned with measurement-position axis 7.

Laser transducers 8 and 10 are supported by a beam 12. In the illustrated example, this beam 12 is mounted in the tool fixed by means, in such a way that the distance separating reference axis 3 and the measurement plane corresponds substantially to 75% of the maximum radius of model propeller 50 to be tuned, and is, for example, on the order of 167 mm. Two positions are possible for this beam 12:

- the position illustrated in the attached drawings, and which makes it to tune a propeller with right-hand pitch; in this position, the beam is disposed close to one side 17 of the tool,
- an opposite position, in which the beam is disposed on side 18 of the tool (see FIG. 2 or 3), and which makes it possible to tune a propeller with left-hand pitch.

Alternatively, the beam is mounted to slide translationally in a direction parallel to measurement-position axis 7 and is provided with translation-blocking means, in order that the distance separating the measurement plane and reference axis 3 can be adjusted, for example as a function of the maximum radius of the model propeller to be tuned.

First laser transducer 8 is disposed in such a way that it emits an incident light beam 9 in fixed direction, striking the suction face of a blade in measurement position close to its leading edge, at a first measurement point 5 (see FIG. 1). This first transducer 8 is adapted for measuring the distance separating it from this first measurement point 5. Second laser transducer 10 is disposed in such a way that it emits an incident light beam 11 in fixed direction, striking the suction face of a blade in measurement position close to its trailing edge, at a second measurement point 6. This second transducer 10 is adapted for measuring the distance separating it from this second measurement point 6. In FIG. 3, which shows a standard propeller 60 mounted in the tool, there can be seen leading edge 62 and trailing edge 63 of blade 61 in measurement position.

Each laser transducer 8, 10 preferably has the following characteristics: focal distance of 85 mm, range of ±20 mm and resolution of 6 μm.

Optical means 4 also comprise a calculation module capable of determining the angle between the chord of the blade in measurement position and a fixed reference plane orthogonal to reference axis 3 on the basis of distance measurements furnished by laser transducers 8, 10. For a known given blade profile and known given sighting directions (of the transducers), a unique value of this angle effectively corresponds to each pair of distances (d1, d2) and vice versa. Since mounting means 2 are adapted to impose an alignment between the axis of rotation of the propeller mounted in the tool and reference axis 3 of the tool, the plane of rotation of the propeller can be considered to be parallel to the reference plane, and the angle determined by optical means 4 can be considered to be the pitch of the blade in measurement position.

This calculation module is also advantageously adapted to calculate:

- the angular deviation between a predetermined specified angle and the current angle determined in real time by the optical means,
- for each laser transducer 8, 10, the deviation between a predetermined specified distance and the current distance measured in real time by the said laser transducer,
- the difference between the two deviations mentioned in the preceding paragraph.

Advantageously the tool comprises electronic control means in the form of a computer (not illustrated) connected detachably to laser transducers 8, 10 by way of an actuator (not illustrated). The control module of the motor and the calculation module of the optical means defined above are preferably integrated in a processing unit of this computer. Advantageously the latter also comprises memory means, in which there can be recorded in particular specified angles and distances and angles determined by optical means 4, and a man-machine interface comprising display means among other components.

The invention also relates to a tool set comprising tool 1 and at least one standard propeller 60 provided with twelve fixed blades, referred to as standard blades, having different pitches between 20 and 60°. Preferably the tool set comprises two standard propellers, and specifically: a standard propeller such as the illustrated propeller 60 (FIGS. 3 and 4), whose blades all have right-hand pitch, and a standard propeller whose blades all have left-hand pitch.

The means for mounting the tool then also comprise, if applicable, additional means (not illustrated) for locking turntable 14 in rotation, which make it possible to lock the turntable in as many positions as the standard propeller has blades, and, in this way, to place in the measurement position any one of the different blades of such a standard propeller mounted in the tool.

This tool set is used by an operator to set a model propeller 50 in the following manner:

- the operator selects, among the standard propeller or propellers, the standard blade that theoretically has a pitch equal (in terms of both orientation to the left or right and of degrees) to the pitch desired for model propeller 50;
- the operator mounts the corresponding standard propeller in tool 1 in such a way that the selected standard blade (for example blade 61) is in measurement position; then he locks turntable 14 in this position;
- using the man-machine interface, the operator initiates recording, in the memory means,
  - of the current angle determined by optical means 4 for this standard blade 61 in measurement position, as a specified angle,
  - of the current distance measured by each laser transducer 8, 10, as a specified distance of the said laser transducer,
- the operator removes standard propeller 60 from the tool;
- the operator mounts model propeller 50 in the tool; in the process, preferably one 51 of the blades of model propeller 50 is automatically disposed in measurement position (by virtue of the polarization means); the operator locks turntable 14 in this position;
- the operator then initiates an operation of pre-setting of the blade in measurement position; during this operation, the display means display in particular the deviation calculated in real time for each laser transducer between the specified distance and the current distance measured in real time by the said laser transducer, as well as the current angle determined in real time by the optical means and/or the deviation between this current angle and the specified angle; the operator manually pivots the blade in measurement position around its pivoting axis, while monitoring the displayed deviations, until these deviations are equal to zero or until he estimates that it is impossible to obtain deviations smaller than those displayed; it should be noted that the operator may manipulate the blade directly by hand or use a fork-shaped gripping tool to obtain better precision; if applicable, the operator manipulates the means for clamping the hub in order to block the blade at least partly; the current angle determined by the optical means for the blade in measurement position is recorded in the memory means of the tool, together with an identification number of the said blade;

the operator then chooses another blade to be set, unlocks turntable 14 and turns it until the chosen blade is disposed in measurement position; the operator then locks turntable 14; for this other blade he performs a pre-setting operation similar to that described above, then turns turntable 14 once again, and so on until all the blades of the model propeller have been pre-set;

before clamping the propeller hub completely and definitively, the operator verifies the pitch obtained for each blade by placing each blade successively in measurement position; if applicable, he may perfect the setting of a blade; the pitch recorded for a blade is the last angle determined by the optical means for the said blade, when model propeller 50 is tuned in this way, the operator removes it from the tool; if applicable, he mounts a second propeller to be tuned to an identical desired pitch in the tool; with this second propeller he proceeds as explained above, since the specified angles and distances remain unchanged. It will be noted that the standard propeller is therefore mounted only one time in the tool for tuning of all those propellers of the aircraft model which must have identical pitches.

If a standard blade theoretically having a pitch equal to the pitch desired for the model propeller does not exist, two solutions are possible.

According to a first solution, the method described above is modified as follows:

the operator preferably selects, among the standard propeller or propellers, the two standard blades that have pitches closest to the pitch desired for model propeller 50;

for each standard blade selected in this way, the operator mounts the corresponding standard propeller in tool 1 in such a way that the selected standard blade is in measurement position; he then initiates recording, in the memory means, of the current angle determined by optical means 4 for the said standard blade and of the current distances measured by the two laser transducers, using the man-machine interface, the operator acquires the pitch desired for the model propeller and initiates an interpolation operation that consists, for example, for the calculation module, in calculating a specified angle as a function of the desired pitch and of the calculated deviation, for each standard blade, between the pitch of the said standard blade and the angle (previously recorded) actually determined by the optical means for this standard blade; alternatively, within the scope of this interpolation operation, the calculation module calculates:

for each standard blade and for each laser transducer, the distance that corresponds theoretically to the pitch of the said standard blade and the deviation between this theoretical distance and the distance (previously recorded) actually measured by the said laser transducer for this standard blade, a specified distance for each laser transducer, as a function of the distance that corresponds theoretically to the pitch desired for the model propeller and the deviations defined in the preceding paragraph, as a specified angle, the angle corresponding to the specified distances calculated above, the operator removes the standard propeller from the tool and mounts model propeller 50 in the tool in order to proceed with setting of each of its blades as explained above.

A second solution consists in not using any standard propeller:

the operator acquires the pitch desired for the model propeller and initiates recording of the said pitch as a specified angle; the calculation module then calculates the distance corresponding to the said pitch for each laser transducer and stores the distance calculated in this way in memory as a specified distance of the said laser transducer, the operator proceeds with setting of each of the blades of the model propeller as explained above.

However, this second solution results in setting precision poorer than that obtained with the first solution.

Nevertheless, regardless of the solution chosen, the method according to the invention makes it possible to set each blade of a model propeller with a precision on the order of 0.05° and to assure traceability of the pitches of propeller blades used subsequently for the wind-tunnel tests. The use of one or more standard propellers makes it possible to obtain precisions of at least 0.05° with certainty and systematically and to guarantee good symmetry in the case of an aircraft model having corresponding symmetric port and starboard propellers turning in opposite directions. In this way deviations smaller than $2.10^{-4}$ are observed between the aircraft thrust coefficient of a port propeller and the aircraft thrust coefficient of the corresponding starboard propeller.

In addition, the method according to the invention is faster to use than the known prior art methods. In particular, it makes it possible to tune a set of four propellers in a time shorter than the time necessary to conduct a customary series of wind-tunnel tests. Consequently, it is recommended that two sets of propellers be manufactured for each aircraft model, in order that one set of propellers can be set at the same time as wind-tunnel tests are being conducted with the other set of propellers.

The invention may be the object of numerous variants with respect to the illustrated embodiment, provided that these variants fall within the scope defined by the claims.

The invention claimed is:

1. A tool for tuning pitch of blades of a model propeller with pivoting blades, comprising:
    a mount to mount a propeller on the tool, the propeller being positioned such that an axis of rotation of the propeller coincides with a fixed reference axis of the tool and enables each blade of the propeller to be successively positioned in a measurement position; and
    a calculation module to determine an angle between a chord of a blade of the propeller in the measurement position and a fixed reference plane of the tool, the reference plane of the tool being orthogonal to the fixed reference axis on a basis of two measurement points sighted by the calculation module on a suction face of the blade in the measurement position.

2. The tool according to claim 1, wherein the measurement points sighted by the calculation module are situated in a measurement plane of the tool, the measurement plane being substantially orthogonal to an axis that orthogonally intersects the fixed reference axis and passes through a root of the blade in the measurement position.

3. The tool according to claim 1, wherein the calculation module can sight a first measurement point close to a leading edge of the blade in the measurement position and a second measurement point close to a trailing edge of the blade.

4. The tool according to claim 1, wherein the calculation module includes two laser transducers, a first of the two laser transducers measuring a first distance separating the first transducer and a first measurement point of the blade in the measurement position, a second of the two laser transducers of measuring a second distance separating the second laser transducer and a second measurement point of the blade in the measurement position.

5. The tool according to claim 4, wherein each of the two laser transducers have a focal distance of 85 mm, a range of ±20 mm, and a resolution of 6 μm.

6. The tool according to claim 4, wherein the first measurement point of the blade is close to a leading edge of the blade, and
wherein the second measurement point is close to a trailing edge of the blade.

7. The tool according to claim 4, further comprising a support beam to support the two laser transducers.

8. The tool according to claim 7, wherein the support beam is slidably mounted in order to adjust a beam distance between a measurement plane of the tool and the fixed reference axis, the measurement plane being substantially orthogonal to an axis that orthogonally intersects the fixed reference axis and passes through a root of the blade in the measurement position.

9. The tool according to claim 8, wherein the beam distance is a distance between 65% to 80% of a maximum radius of the propeller.

10. The tool according to claim 1, wherein the mount includes:
a turntable to receive the propeller, the turntable being mounted to rotate around the fixed reference axis and has a polarization device that can impose a relative angular position, in a plane orthogonal to the fixed reference axis, between the propeller and the turntable, and
a locking device, the locking device being able to lock the turntable in a plurality of predetermined positions, in each of which one blade of the propeller is in the measurement position.

11. The tool according to claim 10, wherein the turntable includes positioning locators to cooperate with positioning holes in a central seat of the propeller.

12. The tool according to claim 10, further comprising a support beam to support the two laser transducers, and
wherein the support beam is mounted to the turntable via a bedplate.

13. The tool according to claim 1, further comprising at least one standard propeller including a plurality of standard blades, each of the standard blades having different fixed pitches.

14. The tool according to claim 13, wherein the at least one standard propeller includes at least two standard propellers, a first one of the at least two standard propellers having blades that are all left-hand pitches and a second one of the at least two standard propellers having blades that are all right-hand pitches.

15. A method for tuning pitch of blades of a model propeller with pivoting blades, comprising the steps of:
providing a tool for tuning including a mount and a calculation module;
providing a model propeller with pivotable blades;
mounting the model propeller on the mount of the tool such that an axis of rotation of the model propeller coincides with a fixed reference axis of the tool and enables each blade of the model propeller to be successively positioned in a measurement position;
placing each blade of the model propeller successively in the measurement position;
determining, with the calculation module, an angle between a chord of each blade of the model propeller in the measurement position and a fixed reference plane of the tool, the plane of the tool being orthogonal to the fixed reference axis on a basis of two measurement points sighted by the calculation module on a suction face of each blade in the measurement position; and
setting a pivot of each blade until an angle determined by the calculation module corresponds to a predetermined specified angle.

16. The method according to claim 15, further comprising the steps of:
providing a standard propeller with a standard blade having a desired pitch for the model propeller;
mounting the standard propeller on the tool such that a selected standard blade is placed in the measurement position;
determining, with the calculation module, an angle of the standard blade in the measurement position and recording the angle in a memory of the tool as the predetermined specified angle; and
removing the standard propeller from the tool prior to mounting the model propeller on the tool for setting the pivotable blades of the model propeller.

17. The method according to claim 15, further comprising the steps of:
providing a standard propeller with at least one standard blade having a pitch that is as close as possible to a desired pitch desired for the model propeller;
mounting the standard propeller on the tool such that the at least one standard blade is placed in the measurement position;
determining, with the calculation module, a measured angle of the standard blade in the measurement position and recording the measured angle in a memory of the tool,
calculating a desired angle corresponding to the desired pitch by comparing and interpolating each previously recorded measured angle and the pitch of the at least one standard blade;
recording the desired angle as the predetermined specified angle; and
removing the standard propeller from the tool prior to mounting the model propeller on the tool for setting the pivotable blades of the model propeller.

* * * * *